US007577446B2

(12) United States Patent
Guvenc et al.

(10) Patent No.: US 7,577,446 B2
(45) Date of Patent: Aug. 18, 2009

(54) WEIGHTED LEAST SQUARE LOCALIZATION METHOD EXPLOITING MULTIPATH CHANNEL STATISTICS FOR NON-LINE-OF-SIGHT MITIGATION

(75) Inventors: Ismail Guvenc, Santa Clara, CA (US); Chia-Chin Chong, Santa Clara, CA (US)

(73) Assignee: NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 11/832,558

(22) Filed: Aug. 1, 2007

(65) Prior Publication Data

US 2008/0032710 A1    Feb. 7, 2008

Related U.S. Application Data

(60) Provisional application No. 60/821,378, filed on Aug. 3, 2006, provisional application No. 60/822,127, filed on Aug. 11, 2006, provisional application No. 60/823,367, filed on Aug. 23, 2006.

(51) Int. Cl.
*H04Q 7/20* (2006.01)

(52) U.S. Cl. ............... 455/456.2; 455/456.5; 455/506; 455/67.11; 455/67.16

(58) Field of Classification Search ............. 455/456.1, 455/456.2, 422.1, 404.2, 67.11, 226.2
See application file for complete search history.

(56) References Cited

U.S. PATENT DOCUMENTS

| | | | | |
|---|---|---|---|---|
| 5,058,200 A | * | 10/1991 | Huang et al. | ............. 455/456.2 |
| 5,644,572 A | | 7/1997 | Olds et al. | |
| 5,754,950 A | * | 5/1998 | Petersson et al. | ............. 455/273 |
| 6,047,192 A | * | 4/2000 | Maloney et al. | ......... 455/456.2 |
| 6,748,224 B1 | * | 6/2004 | Chen et al. | ............... 455/456.1 |
| 7,065,368 B2 | | 6/2006 | You et al. | |
| 7,085,537 B2 | * | 8/2006 | Fernandez-Corbaton et al. | ............ 455/65 |
| 7,170,441 B2 | * | 1/2007 | Perl et al. | ..................... 342/29 |
| 2004/0110514 A1 | * | 6/2004 | Kim et al. | .............. 455/456.1 |
| 2006/0046659 A1 | * | 3/2006 | Haartsen et al. | ......... 455/67.11 |

OTHER PUBLICATIONS

B. Alavi and K. Pahlavan, "Analysis of undetected direct path in time of arrival based UWB indoor geolocation," in *Proc. IEEE Vehic. Technol. Conf. (VTC)*, vol. 4, Dallas, TX, Sep. 2005, pp. 2627-2631.
I. Guvenc, Z. Sahinoglu, A. F. Molisch, and P. Orlik, "Non-coherent TOA estimation in IR-UWB systems with different signal waveforms," in *in Proc. IEEE Int. Workshop on Ultrawideband Networks ( UWBNETS)*, Boston, MA, Oct. 2005, pp. 245-251, (invited paper).
D. Dardari, C. C. Chong, and M. Z. Win, "Analysis of threshold-based TOA estimators in UWB channels," *14th European Signal Processing Conference (EUSIPCO 2006)*, Florence, Italy, Sep. 2006, (Invited Paper).
D. Dardari, C. C. Chong, and M. Z. Win, "Improved lower bounds on time of arrival estimation error in UWB realistic channels," *IEEE Intl. Conf. on Ultra-Wideband (ICUWB 2006)*, Waltham, MA, USA, Sep. 2006 (Invited Paper).

(Continued)

*Primary Examiner*—Temica M Beamer
(74) *Attorney, Agent, or Firm*—Haynes and Boone, LLP

(57) ABSTRACT

A method mitigates NLOS conditions based on weighted least squares (WLS) technique, in which the weights are derived from multipath components (MPCs) of the received signals. The weighting methodology can be used with both linear and non-linear least squares models, as well as different other NLOS mitigation schemes, such as residual based algorithms or maximum likelihood techniques.

15 Claims, 3 Drawing Sheets

Samples from the channel impulse responses at different FTs for NLOS situation

OTHER PUBLICATIONS

M. P. Wylie and J. Holtzman, "The non-line of sight problem in mobile location estimation," in *Proc. IEEE Int. Conf. Universal Personal Commun.*, Cambridge, MA, Sep. 1996, pp. 827-831.

J. Borras, P. Hatrack, and N. B. Mandayam, "Decision theoretic framework for NLOS identification," in *Proc. IEEE Vehicular Technol. Conf. (VTC)*, vol. 2, Ontario, Canada, May 1998, pp. 1583-1587.

S. Gezici, H. Kobayashi, and H. V. Poor, "Non-parametric non-line-ofsight identification," in *Proc. IEEE Vehic. Technol. Conf. (VTC)*, vol. 4, Orlando, FL, Oct. 2003, pp. 2544-2548.

A. Rabbachin, I. Oppermann, and B. Denis, "ML time-of-arrival estimation based on low complexity UWB energy detection," in *Proc. IEEE Int. Conf. Ultrawideband (ICUWB)*, Waltham, MA, Sep. 2006.

P. C. Chen, "A non-line-of-sight error mitigation algorithm in location estimation," in *Proc. IEEE Int. Conf. Wireless Commun. Networking (WCNC)*, vol. 1, New Orleans, LA, Sep. 1999, pp. 316-320.

R. Casas, A. Marco, J. J. Guerrero, and J. Falco, "Robust estimator for non-line-of-sight error mitigation in indoor localization," *Eurasip J. Applied Sig. Processing*, pp. 1-8, 2006.

Y. T. Chan, W. Y. Tsui, H. C. So, and P. C. Ching, "Time-of-arrival based localization under NLOS conditions," *IEEE Trans. Vehic. Technol.*, vol. 55, No. 1, pp. 17-24, Jan. 2006.

B. Li, A. G. Dempster, and C. Rizos, "A database method to mitigate the NLOS error in mobile phone positioning," in *Proc. IEEE Position Location and Navigation Symposium (PLBSS)*, San Diego, CA, Apr. 2006.

X. Li, "An iterative NLOS mitigation algorithm for location estimation in sensor networks," in *Proc. IST Mobile and Wireless Commun. Summit*, Myconos, Greece, Jun. 2006.

L. Cong and W. Zhuang, "Non-line-of-sight error mitigation in mobile location," in *Proc. IEEE INFOCOM*, Hong Kong, Mar. 2004, pp. 650-659.

J. Riba and A. Urruela, "A non-line-of-sight mitigation technique based on ML-detection," in *Proc. IEEE Int. Conf. Acoustics, Speech, and Signal Processing (ICASSP)*, vol. 2, Quebec, Canada, May 2004, pp. 153-156.

S. Venkatesh and R. M. Buehrer, "A linear programming approach to NLOS error mitigation in sensor networks," in *Proc. IEEE IPSN*, Nashville, Tennessee, Apr. 2006.

C. L. Chen and K. T. Feng, "An efficient geometry-constrained location estimation algorithm for NLOS environments," in *Proc. IEEE Int. Conf. Wireless Networks, Commun., Mobile Computing*, Hawaii, USA, Jun. 2005, pp. 244-249.

X. Wang, Z. Wang, and B. O. Dea, "A TOA based location algorithm reducing the errors due to non-line-of-sight (NLOS) propagation," *IEEE Trans. Vehic. Technol.*, vol. 52, No. 1, pp. 112-116, Jan. 2003.

J. J. Caffery and G. L. Stuber, "Overview of radiolocation in CDMA cellular systems," *IEEE Commun. Mag.*, vol. 36, No. 4, pp. 38-45, Apr. 1998.

F. Gustafsson and F. Gunnarsson, "Mobile positioning using wireless networks: Possibilites and fundamental limitations based on available wireless network measurements," *IEEE Sig. Proc. Mag.*, vol. 22, No. 4, pp. 41-53, Jul. 2005.

V. Dizdarevic and K. Witrisal, "On impact of topology and cost function on LSE position determination in wireless networks," in *Proc. Workshop on Positioning, Navigation, and Commun. (WPNC)*, Hannover, Germany, Mar. 2006, pp. 129-138.

PCT International Search Report for International Application No. PCT/US2007/075087; 3 pages.

PCT Written Opinion of the International Searching Authority for International Application No. PCT US2007/075087; 3 pages.

* cited by examiner

WEIGHTED LEAST SQUARE LOCALIZATION METHOD EXPLOITING MULTIPATH CHANNEL STATISTICS FOR NON-LINE-OF-SIGHT MITIGATION

CROSS REFERENCE TO RELATED APPLICATIONS

The present application is related to and claims priority of copending U.S. Provisional Patent Applications (collectively "Copending Provisional Applications"), (a) Ser. No. 60/821,378, entitled "Iterative Method that Jointly Estimates the Time-of-Arrival of the Received Signals and the Terminal Location," filed on Aug. 3, 2006; (b) Ser. No. 60/822,127, entitled "Line-of-Sight (LOS) or non-LOS (NLOS) Identification Method Using Multipath Channel Statistics," filed on Aug. 11, 2006; and (c) Ser. No. 60/823,367, entitled "Weighted Least Square Localization Method Exploiting Multipath Channel Statistics for Non-Line-of-Sight Mitigation," filed on Aug. 23, 2006.

The present application is also related to copending U.S. patent applications (collectively, "Related Applications") (a) Ser. No. 11/832,547, "Method for Estimating Jointly Times-of-Arrival of Signals and the Terminal Location," filed on the same day as the present application, and (b) Ser. No. 11/832,558, entitled "Line-of-Sight (LOS) or non-LOS (NLOS) Identification Method Using Multipath Channel Statistics," filed on the same day as the present application.

The disclosures of the Copending Provisional Applications and the Related Applications are hereby incorporated by reference in their entireties.

BACKGROUND OF THE INVENTION

1. Field of the Invention

The present invention relates to wireless localization and communications technology. More particularly, the present invention relates to estimating a mobile terminal's position using a time-of-arrival (TOA) technique in the presence of non-line-of-sight (NLOS) conditions.

2. Discussion of the Related Art

Because of its very wide bandwidth, ultra-wideband (UWB) technology promises accurate ranging and localization systems capable of resolving individual multipath components (MPCs). Using UWB technology, the time-of-arrival (TOA) of the received signal can be estimated with high accuracy when the first arriving path is correctly identified. Various systems using UWB technology have been disclosed, including those disclosed in the articles: (a) "Analysis of undetected direct path in time of arrival based UWB indoor geolocation," by B. Alavi and K. Pahlavan, published in *Proc. IEEE Vehic. Technol. Conf. (VTC)*, vol. 4, Dallas, Tex., September 2005, pp. 2627-2631; (b) "Non-coherent TOA estimation in IR-UWB systems with different signal waveforms," by I. Guvenc, Z. Sahinoglu, A. F. Molisch, and P. Orlik, published in *in Proc. IEEE Int. Workshop on Ultrawideband Networks (UWBNETS)*, Boston, Mass., October 2005, pp. 245-251, (invited paper); (c) "Analysis of threshold-based TOA estimators in UWB channels," by D. Dardari, C. C. Chong, and M. Z. Win, published in the *14th European Signal Processing Conference (EUSIPCO* 2006), Florence, Italy, September 2006, (Invited Paper); and (d) "Improved lower bounds on time of arrival estimation error in UWB realistic channels," by D. Dardari, C. C. Chong and M. Z. Win, published in *IEEE Intl. Conf. on Ultra-Wideband (ICUWB* 2006), Waltham, Mass., USA, September 2006 (Invited Paper).

One challenge for a localization system is to successfully mitigate NLOS effects. When the direct path between an anchor node (AN) and the mobile terminal is obstructed, the TOA of the signal to the AN is delayed, which introduces a positive bias. An NLOS TOA estimate adversely affects localization accuracy. Hence, prior art cellular networks typically identify ANs under NLOS conditions and mitigate their effects. For example, the article "The non-line of sight problem in mobile location estimation," by M. P. Wylie and J. Holtzman, published in *Proc. IEEE Int. Conf. Universal Personal Commun.*, Cambridge, Mass., September 1996, pp. 827-831, teaches comparing a standard deviation of range measurements with a threshold for NLOS signal identification, when the measurement noise variance is known. Similarly, the article "Decision theoretic framework for NLOS identification," by J. Borras, P. Hatrack, and N. B. Mandayam, "published in *Proc. IEEE Vehicular Technol. Conf. (VTC)*, vol. 2, Ontario, Canada, May 1998, pp. 1583-1587, discloses a decision-theoretic NLOS identification framework using various hypothesis tests for known and unknown probability density functions (PDFs) of the TOA measurements.

The article "Non-parametric non-line-of-sight identification," by S. Gezici, H. Kobayashi, and H. V. Poor, published in *Proc. IEEE Vehic. Technol. Conf. (VTC)*, vol. 4, Orlando, Fla., October 2003, pp. 2544-2548, discloses a non-parametric NLOS identification approach, which allows the PDFs of the TOA (i.e., distance) measurements to be approximated. A suitable distance metric is used between the known measurement noise distribution and the non-parametrically estimated measurement distribution.

The above NLOS identification techniques all assume that the TOA measurements for NLOS base stations (BSs) change over time, which is reasonable for a moving terminal. For a moving terminal, the TOA measurements have a larger variance. However, when the terminal is static (e.g., in wireless personal area network (WPAN) applications), the distribution of the NLOS measurements may show little deviation from the distribution under LOS condition. There, the multipath characteristics of the received signal provide insight useful for LOS/NLOS identification. For example, European Patent Application Publication EP 1,469,685, entitled "A method distinguishing line of sight (LOS) from non-line-of-sight (NLOS) in CDMA mobile communication system," by X. Diao and F. Guo, filed on Mar. 29, 2003, published on Oct. 20, 2004, discloses that a received code division multiple access (CDMA) signal is LOS if: 1) the power ratio of the global maximum path to the local maximum path is greater than a given threshold, and 2) the arrival time difference between the first path and the maximum path is less than a given time interval. Similarly, the article "ML time-of-arrival estimation based on low complexity UWB energy detection," by Rabbachin, I. Oppermann, and B. Denis, published in *Proc. IEEE Int. Conf. Ultrawideband (ICUWB)*, Waltham, Mass., September 2006, discloses that the NLOS identification for UWB systems may be performed by comparing the normalized strongest path with a fixed threshold. In either scheme, judicious parameter selection (e.g., the threshold or the time interval) is essential.

As an alternative to identifying NLOS conditions from the received multipath signal, information derived from the overall mobile network may be used to mitigate NLOS conditions. For example, the article "A non-line-of-sight error mitigation algorithm in location estimation," by P. C. Chen, published in *Proc. IEEE Int. Conf. Wireless Commun. Networking (WCNC)*, vol. 1, New Orleans, La., September 1999, pp. 316-320, discloses a residual-based algorithm for NLOS mitigation. That algorithm is based on three or more available BSs, using location estimates and residuals for different combinations of BSs. (When all the nodes are LOS, three BSs are required to perform a two-dimensional (2-D) localization, while four BSs are required to perform a 3-dimensional (3-D) localization.) The location estimates with smaller residuals are more likely to represent the correct terminal location. Hence, the technique disclosed in the article weights the different location estimates inversely with the corresponding residuals.

Other NLOS mitigation techniques using information derived from the mobile network are disclosed in (a) "Robust estimator for non-line-of-sight error mitigation in indoor localization," by R. Casas, A. Marco, J. J. Guerrero, and J. Falco, published in *Eurasip J. Applied Sig. Processing*, pp. 1-8, 2006; (b) "Time-of-arrival based localization under NLOS conditions," by Y. T. Chan, W. Y. Tsui, H. C. So, and P. C. Ching, published in *IEEE Trans. Vehic. Technol.*, vol. 55, no. 1, pp. 17-24, January 2006; (c) "A database method to mitigate the NLOS error in mobile phone positioning," by B. Li, A. G. Dempster, and C. Rizos, published in *Proc. IEEE Position Location and Navigation Symposium (PLANS)*, San Diego, Calif., April 2006; (d) "An iterative NLOS mitigation algorithm for location estimation in sensor networks," by X. Li, published in *Proc. IST Mobile and Wireless Commun. Summit*, Myconos, Greece, June 2006; (e) "Non-line-of-sight error mitigation in mobile location," by L. Cong and W. Zhuang, published in *Proc. IEEE INFOCOM*, Hong Kong, March 2004, pp. 650-659; (f) "A non-line-of-sight mitigation technique based on ML-detection," by J. Riba and A. Urruela, published in *Proc. IEEE Int. Conf. Acoustics, Speech, and Signal Processing (ICASSP)*, vol. 2, Quebec, Canada, May 2004, pp. 153-156; (g) "A linear programming approach to NLOS error mitigation in sensor networks," by S. Venkatesh and R. M. Buehrer, published in *Proc. IEEE IPSN*, Nashville, Tenn., April 2006; (h) "An efficient geometry-constrained location estimation algorithm for NLOS environments," by C. L. Chen and K. T. Feng, published in *Proc. IEEE Int. Conf. Wireless Networks, Commun., Mobile Computing*, Hawaii, USA, June 2005, pp. 244-249; and (i) "A TOA based location algorithm reducing the errors due to non-line-of-sight (NLOS) propagation," by X. Wang, Z. Wang, and B. O. Dea, published in *IEEE Trans. Vehic. Technol.*, vol. 52, no. 1, pp. 112-116, January 2003.

Some of the prior localization algorithms assign equal reliabilities to each BS, thus these localization algorithms do not take into account NLOS conditions. As a result, the presence of NLOS BSs degrades localization accuracy in these algorithms significantly.

The prior art also includes many weighted least-squares approaches for estimating a mobile terminal position. Typically, in these approaches, the weight for the signal received from each BS is derived from a measurement variance (see, e.g., the articles by M. P. Wylie et al., J. Borras et al., and S. Gezici et al., discussed above). The approaches rely on the fact that, under an NLOS condition, the measurements related to a moving terminal show a large variance. However, such approaches do not reliably provide accurate information regarding NLOS BSs.

Weighted least-squares techniques based on measurement variances typically require a large number of observations. Large memory is therefore required to store the measured distances and the delays that are necessary for estimating a mobile terminal's location.

SUMMARY OF THE INVENTION

The present invention provides an NLOS mitigation technique which suppresses NLOS fixed terminals[1] (FTs) based on the amplitude and delay statistics of a UWB channel. Such statistics include, for example, the kurtosis, mean access delay, and root-mean-square (RMS) delay spread of the received multipath components of the received signals. According to one embodiment of the present invention, a weighted least-squares method uses weights obtained from likelihood functions to distinguish LOS conditions from NLOS conditions.

According to one embodiment of the present invention, a weighted least-squares method of the present invention may be used to enhance the performance of conventional algorithms (e.g., the residual-based weighting NLOS mitigation algorithm disclosed in the article by P. C. Chen et al., discussed in the previous section).

The present invention is better understood upon consideration of the detailed description below, in conjunction with the accompanying drawings.

BRIEF DESCRIPTION OF THE DRAWINGS

FIG. 1(*b*) illustrates the TOA estimation operations based on signals received at FTs 10, 20 and 30.

DETAILED DESCRIPTION OF THE PREFERRED EMBODIMENTS

Figure 1A:
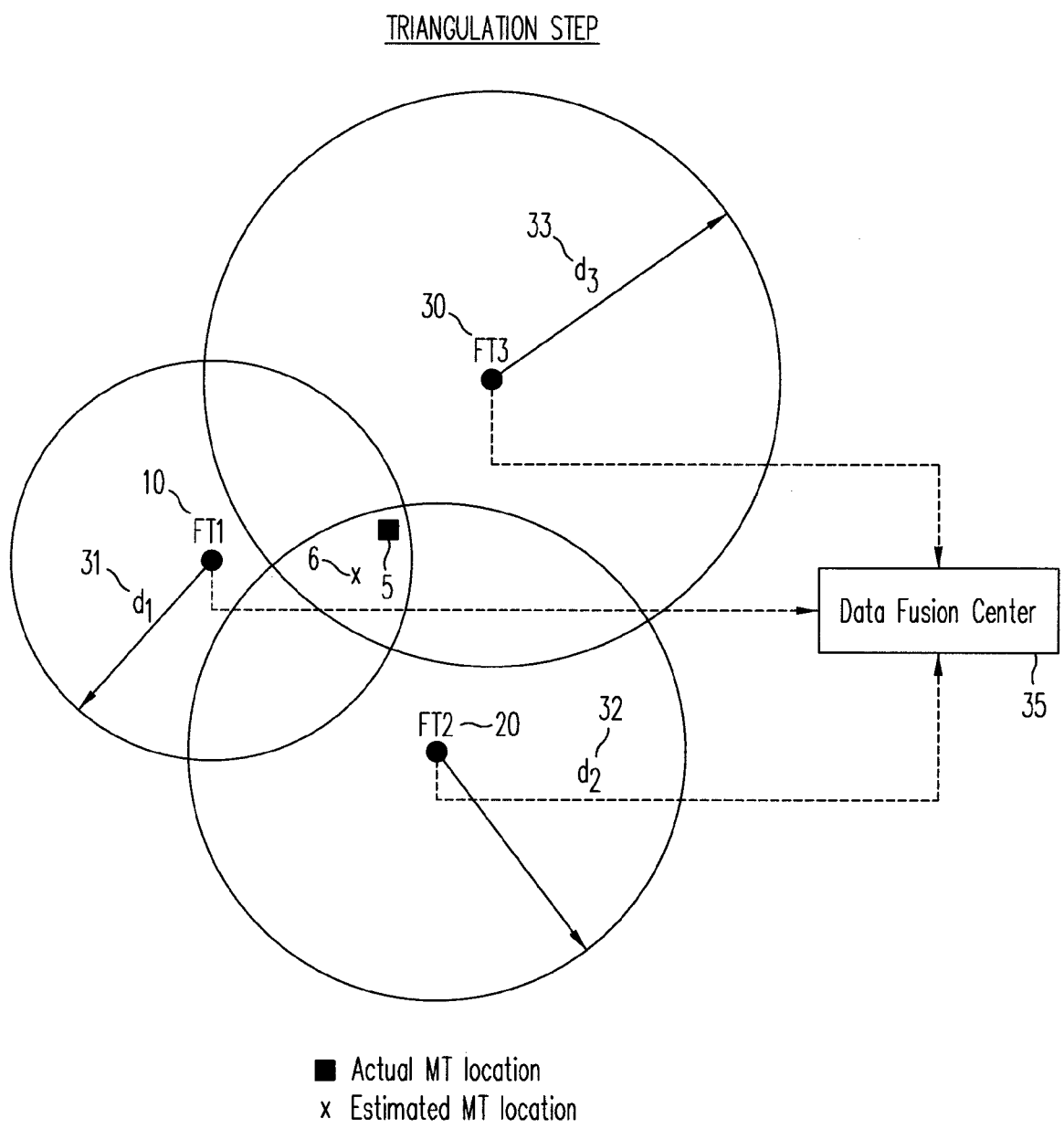
FIG. 1(*a*) illustrates communication system in which TOA estimation and wireless localization operations may be performed based on signals received at different FTs under an NLOS environment.

According to one embodiment of the present invention, a channel impulse response (CIR) h(t) of a received signal may be represented by:

$$h(t) = \sum_{l=1}^{L} \gamma_l \delta(t - \tau_l),$$

where L is the total number of multipath components (MPCs), and $\gamma_l$ and $\tau_l$ are the amplitude and delay of the $l^{th}$ MPC, respectively. The TOA of the received signal is given by $\tau_{toa} = \tau_1$ (i.e., the arrival time for first arriving path). Hypotheses $H_0$ and $H_1$, representing respectively the LOS hypothesis and the NLOS hypothesis, are given by:

$$\begin{cases} H_0: & d/c = \tau_1, \\ H_1: & d/c < \tau_1, \end{cases}$$

where d denotes a distance between a FT and a mobile terminal, and c denotes the speed of light. Under a NLOS condition, even when the first arriving path is correctly identified, the TOA estimate still yields a larger value as compared to the actual distance. Thus, to avoid degradation of localization performance, NLOS FTs are identified and their effects are then mitigated.

The present invention provides a method that uses statistics of received multipath components to distinguish between LOS and NLOS conditions. In one embodiment, statistical data that capture the amplitude and the delay of the received signal (namely, the kurtosis, the mean excess delay, and the RMS delay spread) are used to distinguish between LOS and NLOS conditions.

The kurtosis is the ratio between the fourth order moment of a random variable to the square of its second order moment (i.e., the variance). Since the kurtosis characterizes how peaked the data is, the kurtosis also characterizes how strong the LOS condition is at a multipath CIR. A high kurtosis value for a CIR suggests that the received signal is more likely to be from a LOS source.

For a channel with a CIR h(t), the kurtosis of |h(t)| is given by:

$$\kappa = \frac{E[(|h(t)| - \mu_{|h|})^4]}{E[(|h(t)| - \mu_{|h|})^2]^2} = \frac{E[(|h(t)| - \mu_{|h|})^4]}{\sigma_{|h|}^4},$$

where $\mu_{|h|}$ and $\sigma_{|h|}$ are the mean and the standard deviation of the absolute value of the CIR, respectively. The distribution of $\kappa$ can be obtained for both LOS and NLOS conditions using sample channel realizations. For example, the IEEE 802.15.4a channels provide histograms of $\kappa$ for eight different channel models CM1 to CM8, corresponding to indoor residential LOS and NLOS conditions, indoor office LOS and NLOS conditions, outdoor LOS and NLOS conditions, and industrial LOS and NLOS conditions, respectively. The histograms may each be modeled by a log-normal PDF given by:

$$p(\kappa) = \frac{1}{\kappa\sqrt{2\pi}\,\sigma}\exp\left[-\frac{(\ln(\kappa) - \mu_\kappa)^2}{2\sigma_\kappa^2}\right],$$

where $\mu_\kappa$ is the mean and $\sigma_\kappa$ the standard deviation of $p(\kappa)$. This model is justified using the Kolmogorov-Smirnov (KS) goodness-of-fit hypothesis test at 5% significance level on the IEEE 802.15.4a channels.

While the kurtosis provides information about the amplitude statistics of the received MPCs, the delay statistics of the multipath components are provided by the mean excess delay and the RMS delay spread. According to the "*Wireless Communications: Principles and Practice*", T. S. Rappaport (author), Indianapolis, Ind.: Prentice Hall, 2002, the mean excess delay, $\tau_m$, of a channel is given by:

$$\tau_m = \frac{\int_{-\infty}^{\infty} t|h(t)|^2\,dt}{\int_{-\infty}^{\infty} |h(t)|^2\,dt},$$

and the RMS delay spread, $\tau_{rms}$, is given by:

$$\tau_{rms} = \frac{\int_{-\infty}^{\infty} (t - \tau_m)^2 |h(t)|^2\,dt}{\int_{-\infty}^{\infty} |h(t)|^2\,dt}.$$

Similar to the kurtosis analysis discussed above, the histograms of the mean excess delay and RMS delay spread for the eight different channel models from IEEE 802.15.4a justify a log-normal distributions for the delay in the received signal, based on the Kolomogrov-Smirnov test at the 5% significance level.

If à priori knowledge of the statistics for $\kappa$, $\tau_m$, and $\tau_{rms}$ are available under the LOS and NLOS conditions, likelihood ratio tests can be set up to distinguish between the LOS and NLOS hypotheses. For example, let $P_{los}(x)$ and $P_{los}(x)$ represent the PDFs corresponding to LOS and NLOS conditions, respectively, and let $\kappa$, $\tau_m$, and $\tau_{rms}$ represent the kurtosis, mean excess delay, and RMS delay spread for an observed channel realization h(t), respectively, the following three likelihood ratio tests can each be used to identify LOS/NLOS conditions:

1) Kurtosis Test:

$$\frac{P_{los}^{kurt}(\kappa)}{P_{nlos}^{kurt}(\kappa)} \overset{LOS}{\underset{NLOS}{\gtreqless}} 1,$$

2) Mean Excess Delay Test:

$$\frac{P_{los}^{med}(\tau_m)}{P_{nlos}^{med}(\tau_m)} \overset{LOS}{\underset{NLOS}{\gtreqless}} 1,$$

3) RMS Delay Spread Test:

$$\frac{P_{los}^{rms-ds}(\tau_{rms})}{P_{nlos}^{rms-ds}(\tau_{rms})} \overset{LOS}{\underset{NLOS}{\gtreqless}} 1,$$

In each test, the LOS hypothesis ($H_0$) is selected when the likelihood ratio is greater than 1; otherwise, the NLOS hypothesis ($H_1$) is selected. Taking all the three parameters into account, deriving a joint PDF from individual PDFs of these parameters, a test of the following form may be obtained:

$$\frac{P_{los}^{joint}(\kappa, \tau_m, \tau_{rms})}{P_{nlos}^{joint}(\kappa, \tau_m, \tau_{rms})} \overset{LOS}{\underset{NLOS}{\gtreqless}} 1.$$

A joint PDF is, however, difficult to derive. One approximation may be obtained by assuming the parameters $\kappa$, $\tau_m$, and $\tau_{rms}$ to be independent to get:

$$J(\kappa, \tau_m, \tau_{rms}) \overset{LOS}{\underset{NLOS}{\gtreqless}} 1,$$

where $$J(\kappa, \tau_m, \tau_{rms}) = \frac{P_{los}^{kurt}(\kappa)}{P_{nlos}^{kurt}(\kappa)} \times \frac{P_{los}^{med}(\tau_m)}{P_{nlos}^{med}(\tau_m)} \times \frac{P_{los}^{rms}(\tau_{rms})}{P_{nlos}^{rms}(\tau_{rms})}.$$

This metric from the least-squares algorithm may be used to weight the reliability of each FT.

Identification of the NLOS condition may be used in numerous ways to improve localization accuracy. For example, NLOS FTs may be excluded form the calculation of a location estimate for a mobile terminal. Where the number of FTs available for the location estimate is small, excluding any NLOS FT may be difficult. Furthermore, Venkatesh et al. (discussed above) teach that information in the NLOS FTs can be used to provide better localization accuracy, especially for high geometric dilution of precision (GDOP) geometries. More specifically, when three or more LOS FTs are positioned approximately along a line, including an additional FT located off that line to calculate the position estimate improves localization accuracy, even if the additional FT is NLOS.

For N FTs, the article "Overview of radiolocation in CDMA cellular systems," by J. J. Caffery and G. L. Stuber, published in *IEEE Commun. Mag.*, vol. 36, no. 4, pp. 3845, April 1998, teaches a weighted least-squares solution as follows:

$$\hat{x} = \operatorname*{argmin}_{x} \left\{ \sum_{i=1}^{N} \beta_i (d_i - \|x - x_i\|)^2 \right\}$$

where $\beta_i$ reflects the reliability of the signal received at the ith FT, $\hat{x} = [\hat{x}\ \hat{y}]$ is the estimate of the mobile terminal's position, $x_i = [x_i\ y_i]$ is the known position of the ith FT, $d_i$ is the measured distance between the mobile terminal and the ith FT. One model of $d_i$ is given by:

$$d_i = r_i + b_i + n_i,$$

where $r_i$ is the actual distance between the mobile terminal and the ith FT, $n_i \sim N(0, \sigma^2)$ is the additive white Gaussian noise (AWGN) with variance $\sigma^2$, $b_i$ is the non-negative NLOS bias, given by:

$$b_i = \begin{cases} 0, & \text{if } LOS, \\ \psi \sim \Psi(\mu_\psi), & \text{if } NLOS, \end{cases}$$

where $\Psi(\mu_\psi)$ denotes an exponential distribution with mean $\mu_\psi$.

In Caffery et al., discussed above, the inverse of the variance of the measured distances is used as a reliability metric for the ith FT. In the case of a static terminal, however, the variance of the TOA measurements is not significantly different to allow distinguishing a LOS FT from an NLOS FT.

According to one embodiment of the present invention, performance over the approach of Caffery et al. may be obtained using the following reliability metric $$\beta_i = \log_{10}(1 + J_i(\kappa, \tau_m, \tau_{rms})),$$

which penalizes NLOS FTs by assigning the FTs weights typically between 0 and 1. Such a technique may be referred to as soft weight selection (SWS). The drawback of such an approach is that for LOS nodes, the dynamic range of weights may become very large. A large dynamic range in the weights unnecessarily favors some of the LOS measurements with respect to other LOS measurements, thereby degrading localization accuracy in some instances.

Performance of SWS may be improved by assigning fixed weights to LOS and NLOS measurements, i.e., by using hard weight selection (HWS). Under the HWS approach, $\beta_i$ can be set as $$\beta_i = \begin{cases} k_1, & \text{if } J_i(\kappa, \tau_m, \tau_{rms}) \leq 1 \\ k_2, & \text{if } J_i(\kappa, \tau_m, \tau_{rms}) > 1 \end{cases}$$

where $k_1$ and $k_2$ are two weights appropriately selected to suppress NLOS effects, so that the identified NLOS FTs have limited impact on the WLS solution. For the case $k_1 = 0$ and $k_2 = 1$, the NLOS FTs' contributions are discarded—a technique referred herein as identify and discard (IAD). IAD runs the risk of mis-identification (i.e., mistaking a LOS FT for an NLOS FT, or vice-versa). Hence, in certain cases, there may be insufficient number of identified LOS FTs to estimate the MT location, thereby possibly considerably degrading localization accuracy.

Minimizing the expression in the non-linear cost function discussed above requires a numerical search method, such as steepest descent or Gauss-Newton techniques, which may be computationally costly and require good initialization to avoid converging to local minima in the cost function. (See, for example, "Mobile positioning using wireless networks: Possibilities and fundamental limitations based on available wireless network measurements," by F. Gustafsson and F. Gunnarsson, published in *IEEE Sig Proc. Mag.*, vol. 22, no. 4, pp. 41-53, July 2005.) Alternatively, the cost function may be linearized about the position of a selected FT using a method disclosed in Venkatesh, discussed above. Under that method, the contribution of a selected FT to terminal position x is separated from the others to yield:

$$Ax = p,$$

which has a least-squares solution given by $$x = (A^T A)^{-1} A^T p,$$

where $$A = -2 \begin{bmatrix} x_1 - x_r & y_1 - y_r \\ x_2 - x_r & y_2 - y_r \\ \vdots & \vdots \\ x_{N-1} - x_r & y_{N-1} - y_r \end{bmatrix}$$

and $$p = \begin{bmatrix} d_1^2 - d_r^2 - x_1^2 + x_r^2 - y_1^2 + y_r^2 \\ d_2^2 - d_r^2 - x_2^2 + x_r^2 - y_2^2 + y_r^2 \\ \vdots \\ d_{N-1}^2 - d_r^2 - x_{N-1}^2 + x_r^2 - y_{N-1}^2 + y_r^2 \end{bmatrix}$$

with r being the index for the selected FT (i.e., $(x_r, y_r)$ is the position $x_r$ of the selected FT). As discussed in the article "On impact of topology and cost function on LSE position determination in wireless networks," by V. Dizdarevic and K. Witrisal, published in *Proc. Workshop on Positioning, Navigation, and Commun. (WPNC)*, Hannover, Germany, March 2006, pp. 129-138, linearizing about the selected FT r minimizes the cost function:

$$\|p - Ax\|^2 = \sum_{i=1}^{N-1} (d_i^2 - d_r^2 - x_i^2 + x_r^2 - y_i^2 + y_r^2 + 2(x_i - x_r)x + 2(y_i - y_r)y)^2.$$

As in the non-linear models discussed before, the relative reliability of the ith FT may be characterized by weighting the ith term in the cost function by $\beta_i$. By constructing N-1 by N-1 diagonal matrix $W = \operatorname{diag}(\beta_1, \beta_2, \ldots \beta_{N-1})$, and obtaining $A_w = WA$ and $p_w = WP$, the weighted location estimate x for the mobile terminal may be obtained using the linear model:

$$x = (A_w^T A_w)^{-1} A_w^T p_w.$$

Thus, the resulting least-squares solution to the mobile terminal location x suppresses the effect of NLOS FTs using the likelihood functions obtained from the multipath components of the received signal.

FIG. 1(a) illustrates communication system in which time-of-arrival (TOA) estimation and wireless localization operations may be performed based on signals received at different FTs under an NLOS environment. As shown in FIG. 1, FTs 10, 20, and 30 each measure a TOA for their respective signals received from mobile terminal 5. The TOAs are forwarded to centralized processing unit 35 to estimate a location for mobile terminal 5 by triangulation. Alternatively, mobile terminal 5 may estimate its location using the measurements on the received signal at the FTs.

Figure 1B:
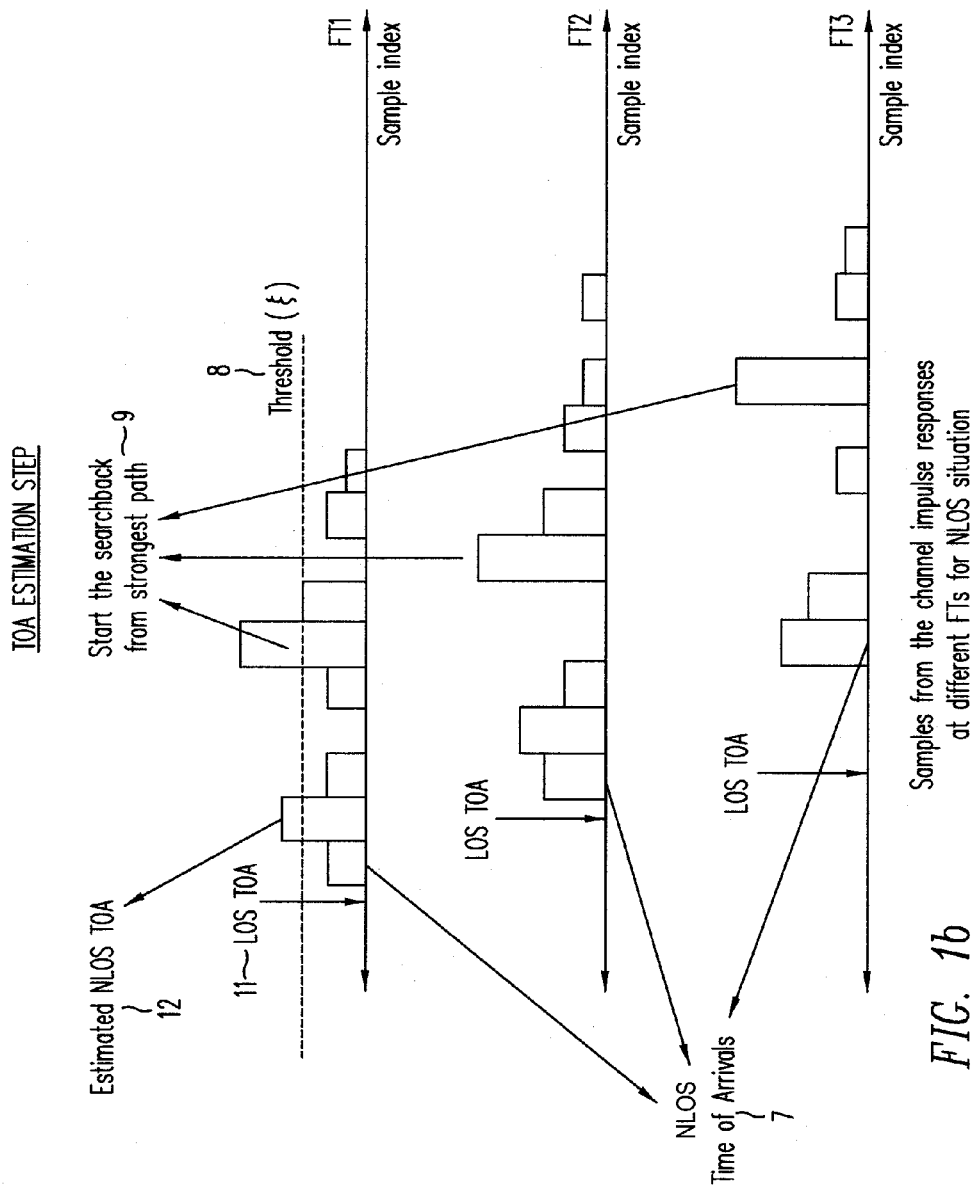

FIG. 1(b) illustrates the TOA estimation operations based on signals received at FTs 10, 20 and 30. Typically, to measure a TOA, each receiver locks on the strongest path. In FIG. 1(b) the respective strongest paths for FTs 10, 20 and 30 are each indicated by reference numeral 9. From the strongest path identified, each receiver searches backwards in time for the first arriving path. Under a LOS condition, the first arriving path (indicated by reference numerals 11 in FIG. 1(b)) corresponds to the shortest distance between the transmitter and the receiver. However, under a NLOS condition (i.e., an obstruction exists between the transmitter and the receiver), the first arriving paths—indicated by reference numeral 7 in FIG. 1(b)—arrive later then LOS first arriving paths 11. A NLOS arriving path thus introduces a positive bias to the TOA estimate, even when the first arriving path is correctly identified. Also, a receiver typically sets a threshold value (indicated by reference numeral 8) that is used to qualify the first arriving path. When NLOS first arriving path 7 has signal strength less than the threshold value, the estimated first arriving path (indicated by reference numeral 12) has an even later value.

In a conventional system, the TOA of the received signal is estimated at each FT using a ranging algorithm (e.g., a threshold-based search technique that uses arbitrary thresholds). The TOA estimates are converted to distance estimates 31, 32 and 33 (see, e.g., FIG. 1(a)). For example, an estimate of mobile terminal location is provided by a least-squares method which selects the value of x which minimizes the sum of the squares of all residuals as follows:

$$\hat{x} = \underset{x}{\operatorname{argmin}} \sum_{i=1}^{N} [d_i - \|x - x_i\|]^2$$

where $d_i$ is the distance between the ith FT and mobile terminal, $x_i$ is the location of the ith FT, for the N FTs available. The mean square residual error ("residual") for the estimated terminal location can be written as $$\text{Residual} = \frac{1}{N} \sum_{i=1}^{N} [d_i - \|\hat{x} - x_i\|]^2$$

Under a LOS condition, the residual depends only on measurement noise and search-back errors. Search-back errors result from inaccurate identification of the first arriving path. Therefore, under the LOS condition, an accurate estimate for the TOA corresponding to each FT is relatively easy to attain. Consequently, the estimated mobile terminal location is closer to the actual mobile terminal location, and the residual error is typically small, assuming sufficient averaging reduces the noise variance. However, when one or more NLOS FTs are present, the residuals are considerably large due to the NLOS biases introduced. As discussed above, the NLOS bias may be due to two reasons: 1) the delay between the LOS TOA and NLOS TOA, and 2) the delay between the estimated NLOS TOA and actual NLOS TOA.

While the first type of bias (i.e., the bias as a result of the difference between LOS TOA and NLOS TOA) cannot be handled directly at the search-back step, such bias may be addressed in the triangulation step. Basically, the LOS or NLOS information of the channel can be obtained from the multipath received signals (e.g., in the form of a likelihood weight), which can be used in the triangulation step to reduce the effects of NLOS FTs.

Figure 2:
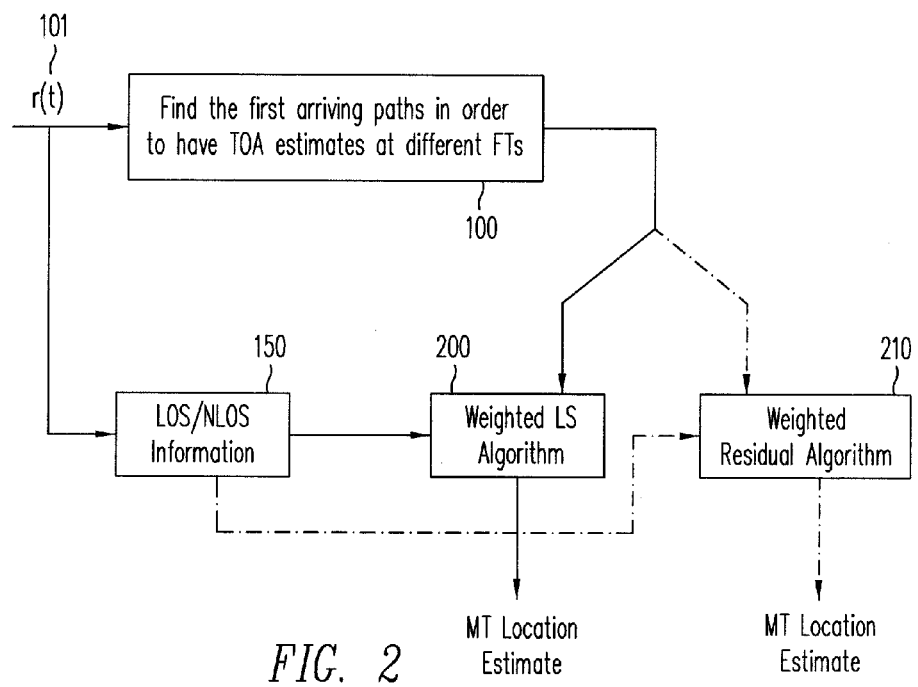
FIG. 2 is a flow diagram illustrating a weighted least-squares (WLS) localization algorithm 200 (or alternatively, residual-based least-squares localization algorithm 210), according to one embodiment of the present invention.

FIG. 2 is a flow diagram illustrating a weighted least-squares (WLS) localization algorithm 200 (or alternatively, residual-based least-squares localization algorithm 210), according to one embodiment of the present invention. As shown in FIG. 2, TOA estimates 100 are provided directly to weighted LS algorithm 200 (or, alternatively, to residual-based weighted LS algorithm 210) together with the likelihood functions 150. Likelihood functions 150 may be used to derive weights in a least-squares localization algorithm to distinguish between LOS FTs and NLOS FTs, as discussed in the Related Application "Line-of-Sight (LOS) or non-LOS (NLOS) Identification Method Using Multipath Channel Statistics," incorporated by reference above.

LOS weights obtained from the likelihood functions may also be used to improve the performances of other algorithms. For example, the residual-based algorithm by P. C. Chen, discussed above, may be improved by assigning the LOS weights to each of the individual residuals of the FTs as in 210. Under this improved method, in calculating the residual errors corresponding to different combinations of FTs, errors corresponding to each observation is further weighted by the LOS weight. By characterizing the reliabilities of the measurements from different FTs, using the information in the MPCs of the received signal, LOS weights according to methods of the present invention can be used with many other different localization algorithms.

Figure 3:
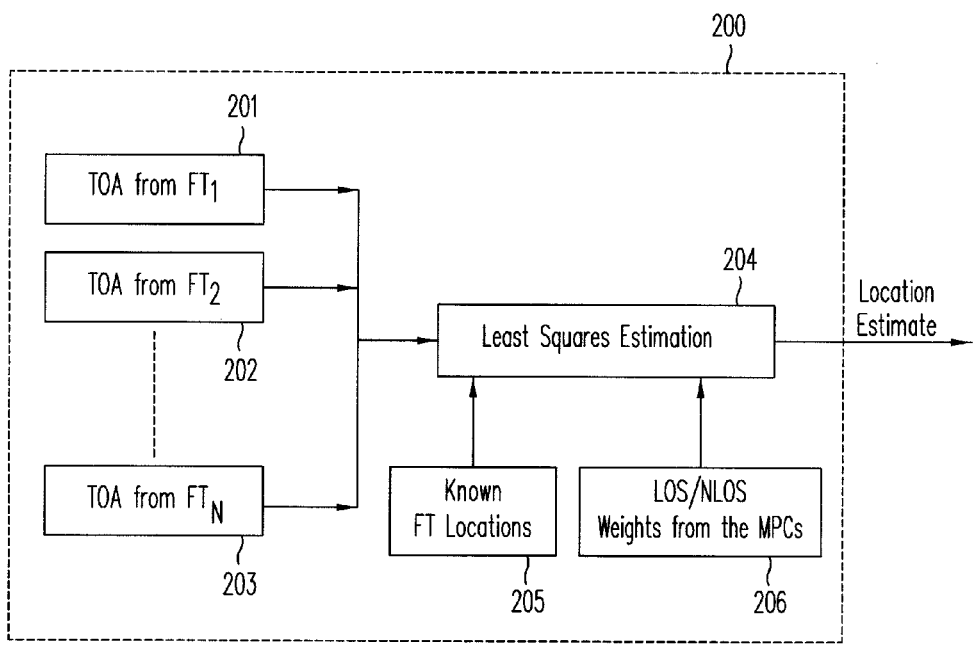
FIG. 3 shows in further detail WLS localization algorithm 200 shown in FIG. 2, according to one embodiment of the present invention.

FIG. 3 shows in further detail WLS localization algorithm 200 shown in FIG. 2, according to one embodiment of the present invention. As shown in FIG. 3, the times-of-arrivals measured at the FTs 201, 202 and 203 are passed to either of the least-squares algorithms of FIG. 2, where distances measurements $d_i$ between the mobile terminal and each FT are calculated. In one embodiment, the mobile terminal location is selected such that a weighted cost function (e.g., the weighted cost function discussed above) is minimized. As discussed above, the least-square model may be linear (thus, yielding a closed-form solution) or non-linear (i.e., requiring a search over a substantial portion, if not all, of the possible mobile terminal locations).

Unlike prior art received signal-based NLOS mitigation methods, which typically require recording of the TOA (or distance) measurements over time, a measurement time-history is not required by the methods of the present invention. So long as LOS/NLOS likelihood PDFs are available, NLOS mitigation can be performed even with as little as a single channel realization from each FT, because variations in the TOA are not considered. NLOS information in the received multipath components is used instead.

Also, existing conventional algorithms favors mobile terminals. The NLOS measurement biases provide a sufficient variation to distinguish NLOS measurements from LOS measurements. For a stationary terminal, however, the NLOS bias may not show sufficient variations, and thus making identification and mitigation of NLOS FTs difficult. Methods of the present invention, however, use information embedded within the MPCs of the received signal for NLOS mitigation, and thus are effective even with stationary terminals.

The methods of the present invention may also be used to improve localization accuracy. When a sufficient number of FTs are available, the NLOS FTs can be discarded to prevent biases in the MT location estimate. The likelihood functions of LOS FTs can weight in the LS localization algorithms discussed above, so that less reliability is given to NLOS measurements.

The above detailed description is provided to illustrate the specific embodiments of the present invention and is not intended to be limiting. Numerous modifications and variations within the scope of the present invention are possible. The present invention is set forth in the accompanying claims.

We claim:

1. A method for localization of a mobile terminal communicating using ultra-wide band signals, comprising:
   receiving signals transmitted between the mobile terminal and a plurality of fixed terminals;
   for each received signal, using a statistical metric based on delays and amplitudes of one or more multipath components, determining a likelihood that the received signal traveled a line-of-sight path; and
   determining the position of the mobile terminal based on times-of-arrival of the received signals using a localization algorithm based in part on the likelihoods of line-of-sight path for the received signals.

2. A method as in claim 1, wherein the statistical metric comprises one or more measures of the kurtosis, the mean excess delay and the RMS delay spread of the received signal.

3. A method as in claim 1, wherein the localization algorithm minimizes a cost function.

4. A method as in claim 3, wherein the cost function is weighted by weights representing a reliability metric of the corresponding received signal.

5. A method as in claim 4, wherein each weight is logarithmically related to the likelihood of the received signal.

6. A method as in claim 4, wherein the statistical metric is derived from multipath components of the corresponding received signal and wherein the weights are selected according to a soft weight selection method.

7. A method as in claim 4, wherein the statistical metric is derived from multipath components of the corresponding received signal and wherein the weights are selected according to a hard weight selection method.

8. A method as in claim 1, where in the localization algorithm is a least-squares algorithm.

9. A method as in claim 1, wherein the localization algorithm is based on residuals.

10. A method as in claim 3, wherein the cost function is a non-linear cost function.

11. A method as in claim 10, wherein minimizing the non-linear cost function comprises using a numerical search method.

12. A method as in claim 3, wherein the cost function is a linearized cost function about a position of a selected one of the fixed terminals.

13. A method as in claim 12, wherein minimizing the linearized cost function comprises constructing a diagonal matrix.

14. A method as in claim 13, wherein the cost function is weighted by weights representing a reliability metric of the corresponding received signal, and wherein the diagonal matrix comprises the weights of the cost function.

15. A method as in claim 1, further comprising, when the likelihood that the received signal traveled a line-of-sight path is determined to be less than a predetermined value, excluding the received signal from participating in the localization algorithm.

* * * * *